Dec. 9, 1930.                H. W. PLEISTER                1,783,976
                     COMBINED BOLT ANCHOR AND SUPPORT
                      Filed Feb. 7, 1928        3 Sheets-Sheet 1

Henry W. Pleister INVENTOR.
BY
Alanley Johnson ATTORNEY.

Dec. 9, 1930.   H. W. PLEISTER   1,783,976
COMBINED BOLT ANCHOR AND SUPPORT
Filed Feb. 7, 1928   3 Sheets-Sheet 2
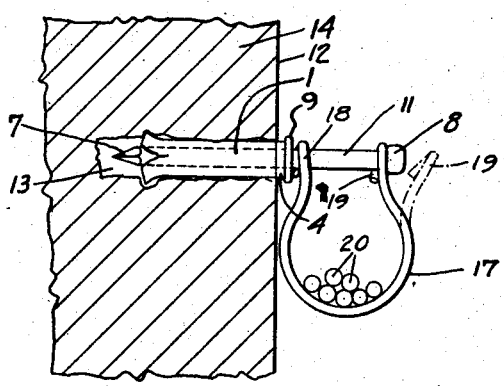
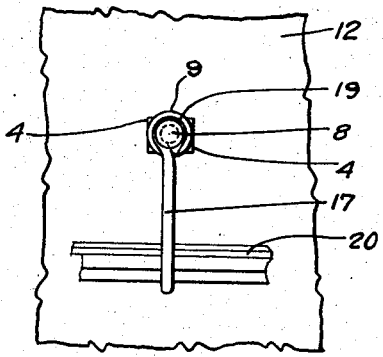
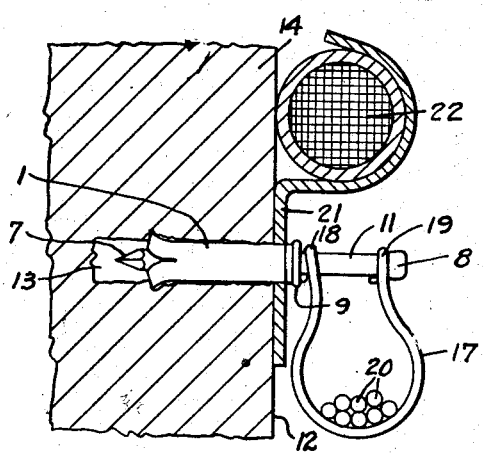
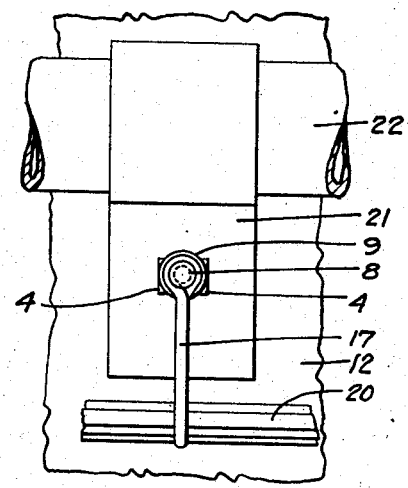
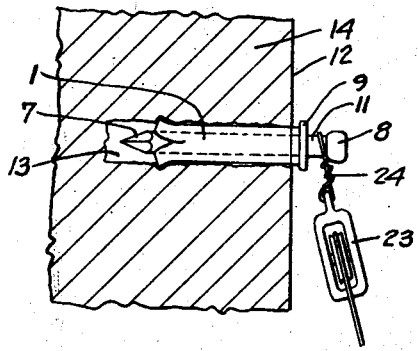
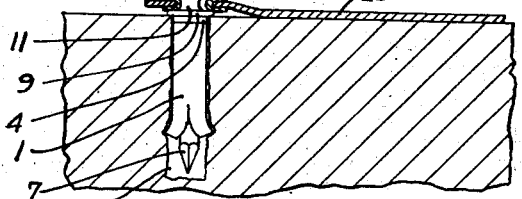
Henry W. Pleister INVENTOR.
BY
Clarke Johnson ATTORNEY.

Dec. 9, 1930.   H. W. PLEISTER   1,783,976
COMBINED BOLT ANCHOR AND SUPPORT
Filed Feb. 7, 1928   3 Sheets-Sheet 3
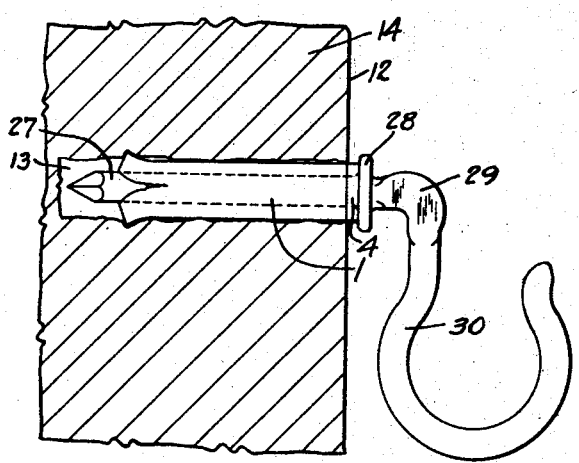
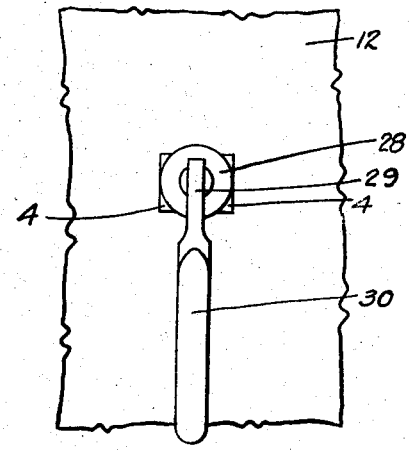
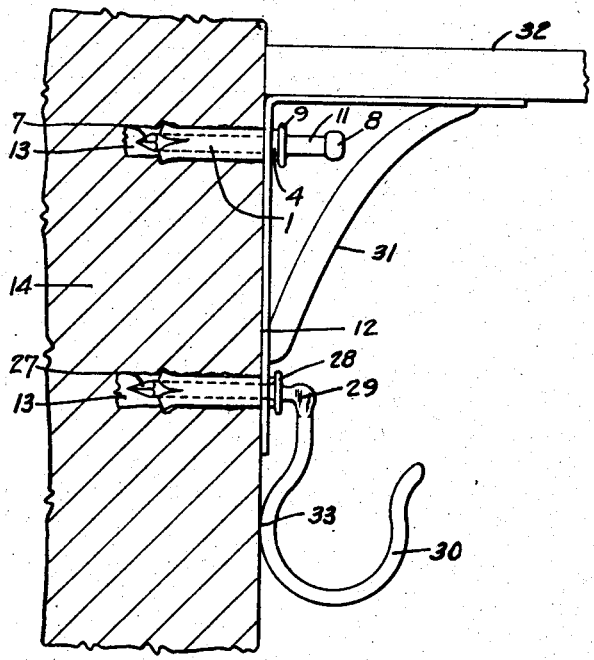
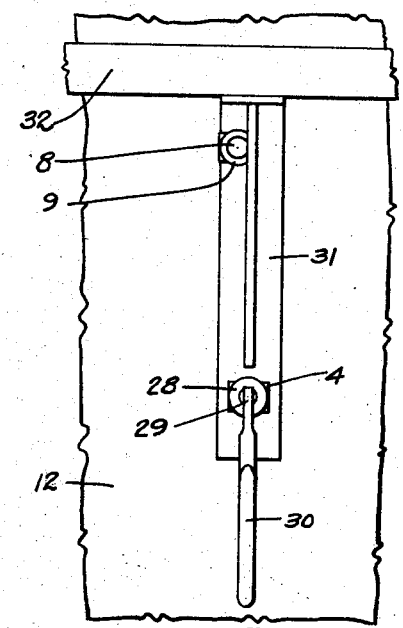
INVENTOR.
Henry W. Pleister
BY
Alexander Johnson
ATTORNEY.

Patented Dec. 9, 1930

1,783,976

UNITED STATES PATENT OFFICE

HENRY W. PLEISTER, OF WESTFIELD, NEW JERSEY, ASSIGNOR TO HENRY B. NEWHALL CORPORATION, OF GARWOOD, NEW JERSEY, A CORPORATION OF NEW JERSEY

COMBINED BOLT ANCHOR AND SUPPORT

Application filed February 7, 1928. Serial No. 252,529.

My invention relates to a combined bolt anchor and support in which an expansible shield is expanded by a longitudinally movable expanding member which member is provided with a false head, stop or collar between its ends, leaving a projecting shank which may be used for various purposes.

My invention further relates to a bridle ring fastening, a cable clamp fastening, a drive ring or hook, a fastening for flexible material as, for example, an awning or a floor covering or similar material, a coat-hanger, and in fact for various analogous purposes, the ones described in the following specification being merely illustrative.

My invention further relates to certain articles of manufacture, combinations and sub-combinations, and details of construction, all of which will be more fully hereinafter described and pointed out in the claims.

In the drawings, the same reference numerals refer to similar parts in the several figures.

Fig. 7 is a vertical section, similar to Fig. 5 showing the exposed shank of the expanding member co-operating with and supporting a bridle ring;

Fig. 8 is a front elevation of the structure shown in Fig. 7;

Fig. 9 is a vertical section showing my improved expansion supporting a cable clamp and also a bridle ring;

Fig. 10 is a front elevation of the structure shown in Fig. 9;

Fig. 11 is a vertical section through a wall of any suitable support showing an awning pulley supported by the exposed shank of the expanding member;

Fig. 12 is a vertical section through a support, such as a concrete or other fire-proof floor, showing the exposed shank of the expanding member cooperating with a flexible member such as a carpet or other floor covering;

Fig. 13 is a vertical section showing a modification in which the head of the exposed shank is extended and bent to form a drive ring or hook;

Fig. 14 is a front elevation of the form shown in Fig. 13;

Fig. 15 is a vertical section through a support showing a bracket partially supported by the drive ring or hook of Fig. 13, the hook in this case being used as a coat hook, or support for any other similar article.

Figure 16 is a front elevation of the form shown in Figure 15.

Figure 1:
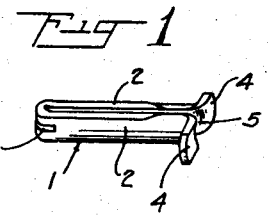
Fig. 1 is a perspective view of one form of expansible shield which may be employed.
Figure 2:
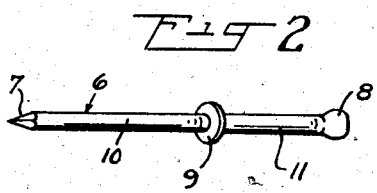
Fig. 2 is a perspective view of the preferred form of expanding member which I employ to expand the shield of Fig. 1, or any other shield.
Figure 3:
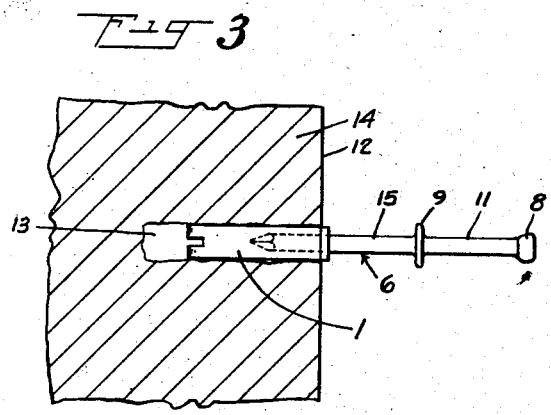
Fig. 3 is a vertical section through a support showing the shield about to be expanded.
Figure 4:
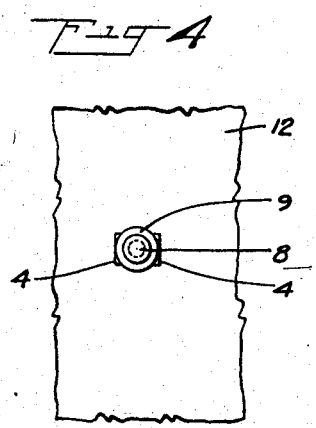
Fig. 4 is a front elevation of the structure shown in Fig. 3.

My invention relates essentially to a combined bolt anchor and support in which the expanding member not only performs its usual function of expanding an expansible shield, but in addition thereto, supports or cooperates with any element or article which may cooperate with it. Various adaptations of my invention may be made, those illustrated in the drawings, and herein described, being simply illustrative.

In the drawings 1 is an expansible shield formed from sheet metal having two sides 2—2, slot 3, head members 4—4 and a throat 5 to receive and guide the expanding member which, as shown in the drawings, is a nail 6 provided with a point 7, a head 8 and a stop, collar, or false head 9 located on the shank 10 intermediate the point 7 and head 8. This stop, collar or false head 9 performs the ordinary function of the nail head, in that it limits the longitudinal movement of the nail within the expansible shield 1 when it engages with the head members 4—4 of the shield, thereby leaving the real head 8 and a portion 11 of the shank protruding from the fastening and extending out from the surface 12 of the wall or other suitable support 14.

Figure 5:
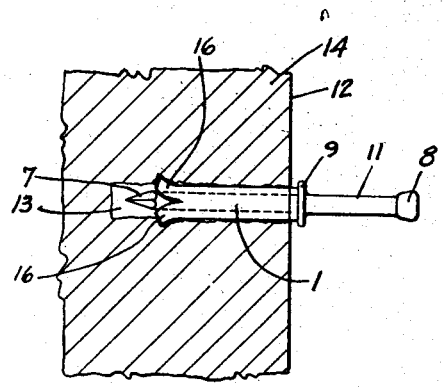
Fig. 5 is a vertical section, similar to Fig. 3, but showing the expanding member driven home and fully expanding the shield.
Figure 6:
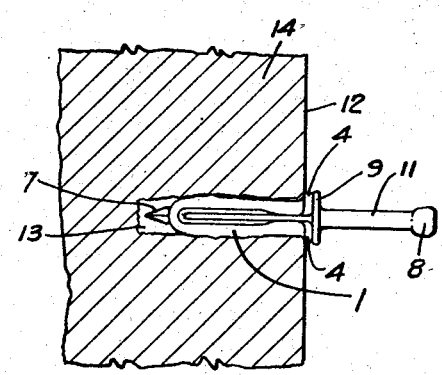
Fig. 6 is a horizontal section taken ninety degrees from the section shown in Fig. 5.

In use a hole 13 is drilled or otherwise formed in the support 14 of any suitable material, usually fireproof material such as concrete, terracotta, brick, stone or any similar material, and the expansible shield 1, of the desired size and capacity for the particular job, is inserted within the hole 13 until the head members 4—4 contact with the surface 12 of the wall or other suitable support. The end 7 of the nail or expanding member is then placed within the throat 5 and the head 8 is driven, by any suitable tool as by a hammer, until the stop, collar or false head 9 is brought into contact with the head members 4—4 when further longitudinal movement in the shield is prevented. This longitudinal movement of the expanding member insures that the portion 15 of the shank lying between the point 7 and the stop or collar 9 will expand the shield 1 as shown in Fig. 5, the end 7 of the nail being preferably forced through the slot 3 so as to obtain a secondary expansion of the bent portions 16—16 as shown in Fig. 5. This leaves the head 8 and the projecting shank 11 on the exterior of the wall or other suitable support so that they may be used for various purposes.

I have shown in Figs. 7 and 8 a bridle ring fastening, which is the same as that just described, and on the projecting shank 11, between the head 8 and the stop, collar or false head 9, is mounted a bridle ring 17 provided with hooks 18 and 19; the hook 19 is adapted to be sprung over the head 8 as shown in Fig. 7. In this figure the dotted position of the hook 19 shows its position before being sprung over the head 8. Telephone or telegraph wires 20—20, usually termed bridle wires, are supported by the bridle ring 17.

In Figs. 9 and 10 I have shown a cable clamp fastening in which the expansion shown in Figs. 1 to 6 is employed to hold the cable clamp 21 to the face 12 of the wall or other suitable support 14, the cable 22 being supported in the usual manner.

On the original installation of the cable clamp the bridle ring 17 may, or may not, be employed. Ordinarily it would not be employed because the cable 22 would take all the traffic load at the time of the installation of the cable. It is often difficult and almost impossible to tell exactly along what lines future business may grow, throwing an additional and excessive traffic load upon the cable 22 and one which it could not accommodate, not being of sufficient capacity. Rather than take this cable 22 down and install an additional and larger cable, it would be a very easy matter to support bridle rings, such as 17, upon the previously installed expansions holding the cable clamp so that a sufficient number of bridle wires 20—20 may be supported by the bridle ring to carry the additional traffic load, which the cable 22 is unable to accommodate. Of course in some cases the bridle ring may be installed at the same time that the cable is mounted.

It is often very difficult to secure awning pulleys, or awnings, to the face of a brick, concrete, stone, terracotta or other wall. In Figure 11 I have shown an awning pulley 23 supported by the wire 24 mounted on the protruding shank 11 of the expanding member; in this case the protruding shank is somewhat reduced from that in the other figures.

In modern office and apartment buildings having fireproof floors it is very difficult to secure a carpet or any other form of floor covering on the floor and insure that it will stay in the position placed. In Fig. 12 I have shown a vertical section of such a fireproof floor in which my expansion is mounted, the protruding shank 11 being somewhat reduced so that the head 8 of the nail does not extend up further from the floor than necessary to cooperate and removably hold the carpet or other floor covering 25, which is preferably provided with an eyelet 26, the eyelet being received on the shank 11 between the head 8 and the collar, stop or false head 9.

In Figures 13 to 16 I have shown a modification of my invention in which the protruding shank is bent to form a hook, the entire expanding member being a drive ring or hook. In these figures the expansible shield 1 is preferably, though not necessarily, the same as that shown in Fig. 1 of the drawings, but the expanding member is a drive ring or hook having a shank 27, a stop, collar or false head 28, a head 29 preferably formed by pressing or swaging the drive ring or hook; the other portion of the expanding member is extended beyond the head 29 and bent to form a ring or hook 30. By blows of a hammer exerted upon the head 29 the drive ring or hook will be driven into the expansible shield 1 until the false head, collar or stop 28 engages with the head members 4—4 when further longitudinal movement is prevented. This will then leave the hook 30 exposed on the outer portion of the wall where it may be used to support bridle wires, or used as a coat-hanger, Fig. 15, or to support any suitable object.

I have shown in Figs. 15 and 16 a drive ring or hook assisting in supporting a bracket 31 which in turn supports a shelf 32. The lower expansion shown in Fig. 15 is the same as that shown in Fig. 13, except that the hook is bent so as to obtain a secondary support at 33 on the surface 12 of the wall or other suitable support 14. In this view 15 the hook is meant to be used as a coat-hanger, though of course, it could be used to support other objects. The upper fastening shown in Fig. 15 is the same as that shown in Fig. 1 to 6 of the drawings, the protruding shank 11 being adapted to support any object that may be desired to be hung on it.

Having thus described this invention in connection with illustrative embodiments thereof, to the details of which I do not desire to be limited, what is claimed as new and what is desired to secure by Letters Patent is set forth in the appended claims.

What I claim is:—

1. A bridle ring fastening comprising the combination of an expansible shield, an expanding member to expand the shield, said member being provided with a stop or collar between its ends to insure that a portion of the expanding member will project from the shield, and a bridle ring provided with hooks adapted to hook on the projecting portion of the expanding member.

2. A bridle ring fastening comprising the combination of an expansible shield, a nail provided with a stop or collar mounted between its ends, said stop or collar adapted to act as a supplemental nail head and contact with the shield, and a spring bridle ring provided with hooks adapted to spring and hook over the shank of the nail located between the head and supplemental head of the nail.

HENRY W. PLEISTER.